(12) United States Patent
Aguirre et al.

(10) Patent No.: US 11,175,160 B2
(45) Date of Patent: Nov. 16, 2021

(54) MAGNETIC FIELD SENSOR AND METHOD WITH REDUCED DISTORTION MEASUREMENT IN SIDESHAFT APPLICATIONS

(71) Applicant: Allegro MicroSystems, LLC, Manchester, NH (US)

(72) Inventors: Pablo Aguirre, Montevideo (UY); Juan Manuel Cesaretti, Ciudad de Buenos Aires (AR); Jesse Lapomardo, Pembroke, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 143 days.

(21) Appl. No.: 16/657,032

(22) Filed: Oct. 18, 2019

(65) Prior Publication Data
US 2021/0116263 A1    Apr. 22, 2021

(51) Int. Cl.
*G01D 5/14*    (2006.01)
*G01D 18/00*    (2006.01)

(52) U.S. Cl.
CPC .............. *G01D 5/14* (2013.01); *G01D 18/008* (2013.01)

(58) Field of Classification Search
CPC ................................. G01D 5/14; G01D 18/008
See application file for complete search history.

(56) References Cited

U.S. PATENT DOCUMENTS

| | | | | |
|---|---|---|---|---|
| 6,894,487 B2* | 5/2005 | Kunz-Vizenetz | ...... | G01D 5/145 324/207.23 |
| 7,203,618 B2* | 4/2007 | Hammerschmidt | ... | G01B 21/22 702/150 |
| 7,319,320 B2* | 1/2008 | Kawashima | .......... | G01D 5/145 324/207.25 |
| 7,663,360 B2* | 2/2010 | Matsumoto | ............ | G01D 5/145 324/207.25 |
| 8,373,410 B2* | 2/2013 | Frachon | ................. | G01D 5/145 324/207.25 |

(Continued)

OTHER PUBLICATIONS

U.S. Appl. No. 16/254,869, filed Jan. 23, 2019, Weiland et al.
(Continued)

*Primary Examiner* — Walter L Lindsay, Jr.
*Assistant Examiner* — Milton Gonzalez
(74) *Attorney, Agent, or Firm* — Daly, Crowley, Mofford & Durkee, LLP (57) ABSTRACT

A magnetic field sensor includes an analog front end having first and second magnetic field sensing elements arranged at approximately 90-degrees with respect to each other, a pre-processor and an arctangent processor. The first and second magnetic field sensing elements are arranged in a sideshaft orientation with respect to a rotating object and offset with respect to an axis of rotation of the rotating object, the rotating object having a radial axis and a tangential axis. The pre-processor is configured to receive the first and second magnetic field signals from the analog front end and to apply a correction factor to one or both of the first and second magnetic field signals to produce first and second scaled magnetic field signals. The arctangent processor is configured to calculate an arctangent value of the first and second scaled magnetic field signals.

15 Claims, 5 Drawing Sheets

(56) References Cited

U.S. PATENT DOCUMENTS

| | | | | |
|---|---|---|---|---|
| 8,519,700 | B2* | 8/2013 | Jerance | G01D 5/145 |
| | | | | 324/207.25 |
| 8,564,283 | B2* | 10/2013 | Mita | G01D 5/145 |
| | | | | 324/207.25 |
| 9,389,060 | B2 | 7/2016 | Romero et al. | |
| 9,400,164 | B2 | 7/2016 | Daubert et al. | |
| 9,869,566 | B2 | 1/2018 | Tima et al. | |
| 9,982,989 | B2* | 5/2018 | Ausserlechner | G01B 7/30 |
| 10,408,639 | B2 | 9/2019 | Hakspiel et al. | |
| 2018/0335294 | A1* | 11/2018 | Ausserlechner | G01D 3/036 |
| 2019/0113592 | A1 | 4/2019 | Rigoni et al. | |

OTHER PUBLICATIONS

Allegro MicroSystems, LLC Application Note "Advanced On-Chip Linearization in the A1332 Angle Sensor IC", Jan. 13, 2015, 12 pages.

\* cited by examiner

MAGNETIC FIELD SENSOR AND METHOD WITH REDUCED DISTORTION MEASUREMENT IN SIDESHAFT APPLICATIONS

CROSS-REFERENCE TO RELATED APPLICATIONS

Not Applicable.

STATEMENT REGARDING FEDERALLY SPONSORED RESEARCH

Not Applicable.

FIELD

This disclosure relates generally to magnetic field sensors and, more particularly, to magnetic field sensors providing an angle measurement in a sideshaft application where the sensor is off-axis with respect to a rotating object.

BACKGROUND

As is known, magnetic field sensors are used in a variety of applications. One example application is in motion (e.g., rotation) detectors where a magnetic field sensor is used to detect motion of an object, such as a ferromagnetic object, for example, a gear or ring magnet. In motion detectors, the magnetic field is typically detected by one or more magnetic field sensing elements, such as Hall effect elements or magnetoresistance elements, which provide a signal (i.e., a magnetic field signal) proportional to a detected magnetic field.

Some motion detectors generate an output signal indicative of the speed of motion of the object. Other motion detectors generate an output signal indicative of a direction of motion of the object as well. One such motion detector is described in U.S. Pat. No. 8,624,588 entitled "Apparatus and Method for Providing an Output Signal Indicative of a Speed of Rotation and a Direction of Rotation as a Ferromagnetic Object," which is assigned to the assignee of the present disclosure and incorporated herein by reference in its entirety.

Motion detectors are widely used in automobile control systems, for example to detect motion of a target object (e.g., camshaft) and to provide information (e.g., an absolute angle of rotation of the target object) to an engine control processor for ignition timing control, fuel management and other operations. With this information, the engine control processor can adjust the timing of firing of the ignition system, the timing of fuel injection by the fuel injection system and perform other operations.

In high precision applications such as automobiles, accuracy variations in the detected motion of a target object (e.g., resulting from irregularities in a sensed target profile of the target object) can be problematic. Engine ignition timing, for example, depends on consistent detection accuracy. Some magnetic field sensor integrated circuits (ICs) contain circuitry and methods to mitigate the effects of irregularities resulting from mechanical variations such as rotational wobble or changes in an airgap between the IC and the target object.

SUMMARY

According to the disclosure, a method for detecting an angle of a magnetic field associated with a rotating object having an axis of rotation, a radial axis, and a tangential axis includes receiving first and second magnetic field signals from an analog front end including first and second magnetic field sensing elements arranged at approximately 90-degrees with respect to each other and in a sideshaft orientation with respect to the rotating object with the first and second magnetic field sensing elements offset with respect to the axis of rotation wherein the first magnetic field signal is associated with the first magnetic field sensing element and the second magnetic field signal is associated with the second magnetic field sensing element, processing the first and second magnetic field signals to produce first and second scaled magnetic field signals, and calculating an arctangent value of the first and second scaled magnetic field signals to determine the angle of the magnetic field associated with the rotating object.

With this method, distortion in angle measurement can be addressed and reduced in an off-axis sensor arrangement. This advantage is achieved by pre-processing the magnetic field signals received from the analog front end of the magnetic field sensor prior to performing the arctangent calculation.

Features may include one or more of the following individually or in combination with other features. Processing the first and second magnetic field signals to produce the first and second scaled magnetic field signals can include applying a correction factor to at least one of the first and second magnetic field signals. The first magnetic field sensing element can be aligned with the radial axis of the rotating object and the second magnetic field sensing element can be aligned with the tangential axis of the rotating object. In the method, applying the correction factor can include multiplying the second magnetic field signal associated with the second magnetic field sensing element by two times a calibration factor (k). The calibration factor (k) can be one. The calibration factor (k) can be between approximately 0.2 and 2.0 and in some embodiments between approximately 1.0 and 1.5. The first magnetic field sensing element can be aligned at 45-degrees with respect to the radial axis of the rotating object and the second magnetic field sensing element can be aligned at 45-degrees with respect to the tangential axis of the rotating object. In the method, applying the correction factor can include multiplying the first magnetic field signal by three times a calibration factor (k) and multiplying the second magnetic field signal by three times the calibration factor (k) and calculating the arctangent can include calculating the arctangent of linear combinations of the first and second magnetic field signals. The linear combinations can include 3kBx-By and 3kBy-Bx, where Bx is the first magnetic field signal and By is the second magnetic field signal. The calibration factor (k) can be one. The calibration factor (k) can be between approximately 0.2 and 2.0 and in some embodiments between approximately 0.5 and 1.0. In the method, calculating the arctangent value can include using a CORDIC processor. In the method, any error in the first magnetic field signal associated with first magnetic field sensing element or the second magnetic field signal associated with second magnetic field sensing element can be compensated for prior to calculating the arctangent value. The method can further include calculating the correction factor during a calibration phase.

Also described is a magnetic field sensor including an analog front end including first and second magnetic field sensing elements arranged at approximately 90-degrees with respect to each other and in a sideshaft orientation with respect to a rotating object, with the first and second magnetic field sensing elements offset with respect to an axis of rotation of the rotating object having a radial axis and a tangential axis, a pre-processor configured to receive the first and second magnetic field signals from an analog front end, wherein the first magnetic field signal is associated with the first magnetic field sensing element and the second magnetic field signal is associated with the second magnetic field sensing element, and to apply a correction factor to one or both of the first and second magnetic field signals to produce first and second scaled magnetic field signals, and an arctangent processor configured to calculate an arctangent value of the first and second scaled magnetic field signals.

Features may include one or more of the following individually or in combination with other features. The arctangent processor may include a CORDIC processor. The first magnetic field sensing element can be aligned with the radial axis of the rotating object and the second magnetic field sensing element can be aligned with the tangential axis of the rotating object. Applying the correction factor can include multiplying the second magnetic field signal associated with the second magnetic field sensing element by two times a calibration factor (k). The calibration factor (k) can be one. The calibration factor (k) can be between approximately 0.2 and 2.0 and in some embodiments between approximately 1.0 and 1.5. The first magnetic field sensing element can be aligned at 45-degrees with respect to the radial axis of the rotating object and the second magnetic field sensing element can be aligned at 45-degrees with respect to the tangential axis of the rotating object. The correction factor can be applied by multiplying the first magnetic field signal by three times a calibration factor (k) and multiplying the second magnetic field signal by three times the calibration factor (k) and calculating the arctangent can include calculating the arctangent of linear combinations of the first and second magnetic field signals, wherein the linear combinations can include 3kBx-By and 3kBy-Bx, where Bx is the first magnetic field signal and By is the second magnetic field signal. The calibration factor can be one. The calibration factor can be between approximately 0.2 and 2.0 and in some embodiments between approximately 0.5 and 1.0. The rotating object can be a ring magnet. The correction factor can be calculated during a calibration phase of the magnetic field sensor.

According to a further aspect, an apparatus includes means for detecting a magnetic field along a radial axis and generating a first magnetic field signal indicative of a magnetic field detected proximate a rotating object, and for detecting a magnetic field along a tangential axis of the rotating object and generating a second magnetic field signal indicative of the magnetic field detected proximate the rotating object, means for applying a correction factor to one or both of the first and second magnetic field signals received from the means for detecting the magnetic field along the radial axis and the tangential axis to produce scaled first and second magnetic field signals, and means for calculating an arctangent value of the scaled first and second magnetic field signals.

Features may include one or more of the following individually or in combination with other features. The means for detecting the magnetic field can include a side-shaft arrangement where the means for detecting the magnetic field along the radial axis and the means for detecting the magnetic field along the tangential axis are offset with respect to an axis of rotation of the rotating object.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Before describing the present disclosure, some introductory concepts and terminology are explained. As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of maximum sensitivity perpendicular to a substrate, while metal based or metallic magnetoresistance elements (e.g., GMR, TMR, AMR) and vertical Hall elements tend to have axes of maximum sensitivity parallel to a substrate.

As used herein, the term "magnetic field signal" is used to describe any signal that results from a magnetic field experienced by a magnetic field sensing element.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, a current sensor, or a proximity detector. A rotation detector can sense rotation of an object, for example, advance and retreat of magnetic domains of a ring magnet or advance and retreat of gear teeth of a ferromagnetic gear. The term "movement detector" can be used to describe either a rotation detector or a magnetic field sensor that can sense different movement, e.g., linear movement, of a ferromagnetic object, for example, linear movement of magnetic domains of a ring magnet or linear movement of gear teeth of a ferromagnetic gear.

Magnetic field sensors are used in a variety of applications, including, but not limited to an angle sensor that senses an angle of a direction of a magnetic field, a current sensor that senses a magnetic field generated by a current carried by a current-carrying conductor, a magnetic switch that senses the proximity of a ferromagnetic object, a rotation detector (or movement detector) that senses passing ferromagnetic articles, for example, magnetic domains of a ring magnet or a ferromagnetic target (e.g., gear teeth) where the magnetic field sensor is used in combination with a back-bias or other magnet, and a magnetic field sensor that senses a magnetic field density of a magnetic field. The circuits and techniques described herein apply to any magnetic field sensor capable of detecting a magnetic field.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

Figure 1:
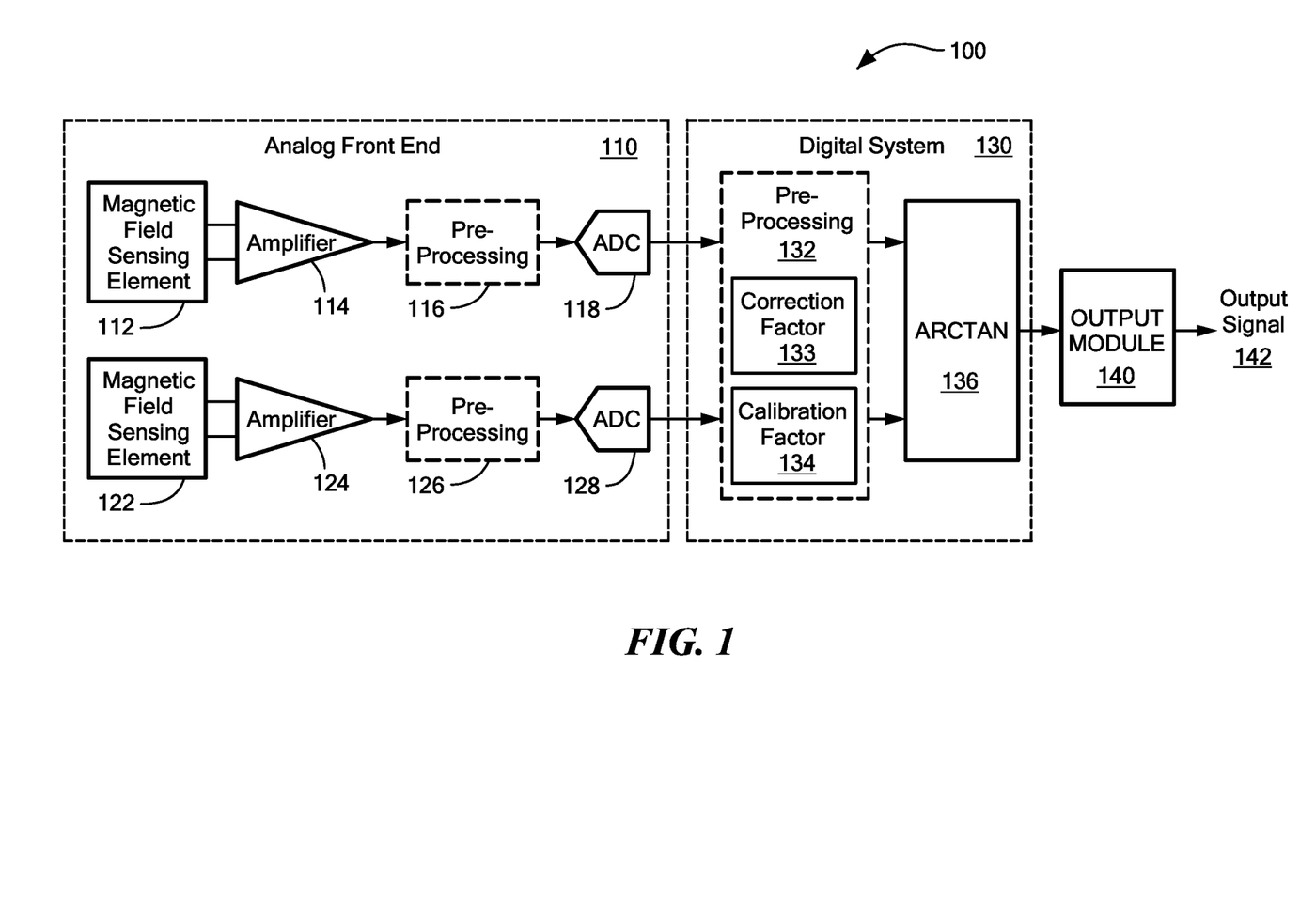
FIG. 1 is a block diagram of a magnetic field sensor including pre-processing of signals received from an analog front end, according to the disclosure.

Referring to FIG. 1, a magnetic field sensor 100 includes an analog front end 110, a digital system 130, and an output module 140. The front end 110 includes a first channel having at least a first magnetic field sensing element 112, an amplifier 114, a pre-processing block 116, and an analog-to-digital converter (ADC) 118, and a second channel having at least a second magnetic field sensing element 122, an amplifier 124, a pre-processing block 126, and an analog-to-digital converter (ADC) 128. The pre-processing block may be referred to as a "pre-processor" herein. The magnetic field sensing elements 112, 122 are configured to generate a magnetic field signal indicative of a magnetic field associated with an object (e.g., magnet) proximate the sensing elements. The sensor 100 is configured to detect the angle of rotation of the object (see., e.g., rotating object 220 in FIG. 2). The object can be a ring magnet or any other rotating object having magnetic or ferromagnetic properties.

The amplifiers 114, 124 can be used to process the magnetic field sensing element output signal to generate a further signal for coupling to an ADC 118, 128, or to a pre-processing block 116, 126 and then to the ADC 118, 128, respectively, as will be described herein. The ADC 118, 128 is configured to convert the analog magnetic field signal into a digitized magnetic field signal for coupling to the digital system 130.

The digital system 130 includes a pre-processing block 132 and an arctangent (or more generally "arctan") calculation block 136, which for example may include a CORDIC processor. The pre-processing of the signal(s) received from the analog front end 110 can occur in the analog front end 110 at pre-processing block 116, 126 and/or in the digital system 130 at pre-processing block 132. In either situation, the pre-processing occurs prior to the arctangent calculation block 136. As such, distortion in the resulting magnetic field angle measurement is accounted for and reduced prior to performing the arctangent calculation, as will be appreciated in light of the present disclosure. Thus, post-arctangent calculation processing may be reduced or even eliminated.

One or more of pre-processing blocks 116, 126, 132 apply a correction factor (e.g., correction factor 133) to one or both of the magnetic field signals to thereby scale the magnetic field signals. This is particularly advantageous in a sideshaft or off-axis sensor, where the amplitude or the orthogonality of the magnetic field signals may differ significantly, thus causing distortion in the angle measurement. With the described pre-processing arrangements, angle error can be reduced by approximately 10-100 times, and the need for post-arctangent processing can be reduced, as will be appreciated in light of the present disclosure. The pre-processing block 116, 126 can include a calibration processing to calibrate the sensor. The pre-processing block 132 can use a calibration factor 134 in conjunction with the correction factor 133 to scale the magnetic field signals, as will be appreciated in light of the present disclosure.

The arctan calculation block 136 can include a CORDIC processor or any other processor that calculates the arctangent of the magnetic field signals. The arctan calculation can occur on-chip (i.e., on the same chip as the elements that sense the magnetic field) or off-chip (i.e., by circuitry not on the same chip as the elements that sense the magnetic field). The output module 140 is configured to provide one or more output signals 142 indicative of the angle of the target object and/or indicative of other aspects of the motion of the object such as speed and/or direction of rotation.

Figures 2, 2A, 2B:
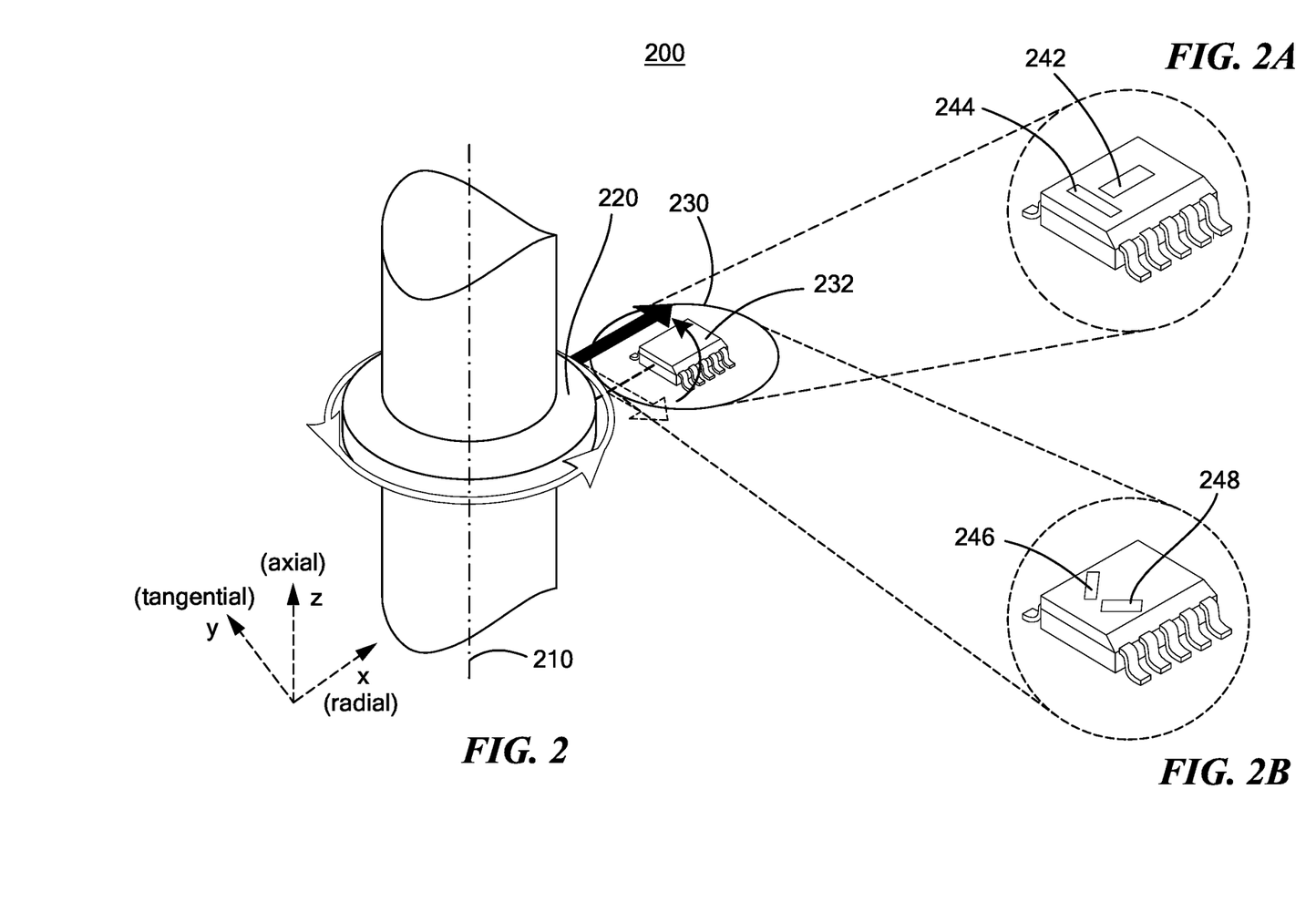
FIG. 2 is a partial perspective view of a rotating magnet and a sensor that is off-axis with respect to the axial axis of the rotating magnet.
FIG. 2A is a perspective view of the off-axis sensor with the sensing elements aligned with the radial and tangential axes of the rotating magnet.
FIG. 2B is a perspective view of the off-axis sensor with the sensing elements offset by a predetermined angle with respect to the radial and tangential axes of the rotating magnet.

FIG. 2 is a partial perspective view of a system 200 in which at least an angle of rotation of a rotating target object (e.g., ring magnet) 220 is detected by a sensor integrated circuit (IC) 232 supported by a structure 230 such as a printed circuit board. Radial (x), tangential (y), and axial (z) axes associated with the rotating object 220 are shown, where the axial (z) axis represents a direction of the axis of rotation 210 of the rotating object 220, the radial (x) axis represents a radial direction of the object 220 and the tangential (y) axis represents a tangential direction of the object 220. This configuration in which the sensor 232 is off-axis with respect to the axis of rotation 210 of the rotating object 220 may be referred to as an "off-axis" or "sideshaft" configuration. A different configuration in which the sensor 232 is on-axis with respect to the axis of rotation 210 of the rotating object 220 (not shown) may be referred to as "on-axis".

FIG. 2A is an enlarged perspective view of the off-axis sensor 232 with the magnetic field sensing elements aligned with the radial (x) axis and tangential (y) axis of the rotating object. Note that magnetic field sensing element 242 is aligned with the radial (x) axis and that magnetic field sensing element 244 is aligned with the tangential (y) axis. Refer, for example, to Equations 6-7 below for a detailed discussion of the pre-processing using a radial and tangential aligned arrangement shown in FIG. 2A.

FIG. 2B is an enlarged perspective view of an alternative version of the off-axis sensor 232 with the magnetic field sensing elements offset by a predetermined angle with respect to the radial and tangential axes of the rotating object 220. In this arrangement, the magnetic field sensing element 246 is offset by 45-degrees with respect to the tangential (y) axis of the rotating object 220 and the magnetic field sensing element 248 is offset by 45-degrees with respect to the radial (x) axis of the rotating object 220. Refer, for example, to Equations 9-10 below for a detailed discussion of the pre-processing using the 45-degree offset magnetic field sensing arrangement, as shown in FIG. 2B. This arrangement of elements as shown in FIG. 2B can provide improved angular resolution as compared to the arrangement of FIG. 2A since this placement provides magnetic field signals having approximately the same amplitude (as evidenced by Equations 9-10), as will be appreciated in light of the present disclosure.

Figure 3:
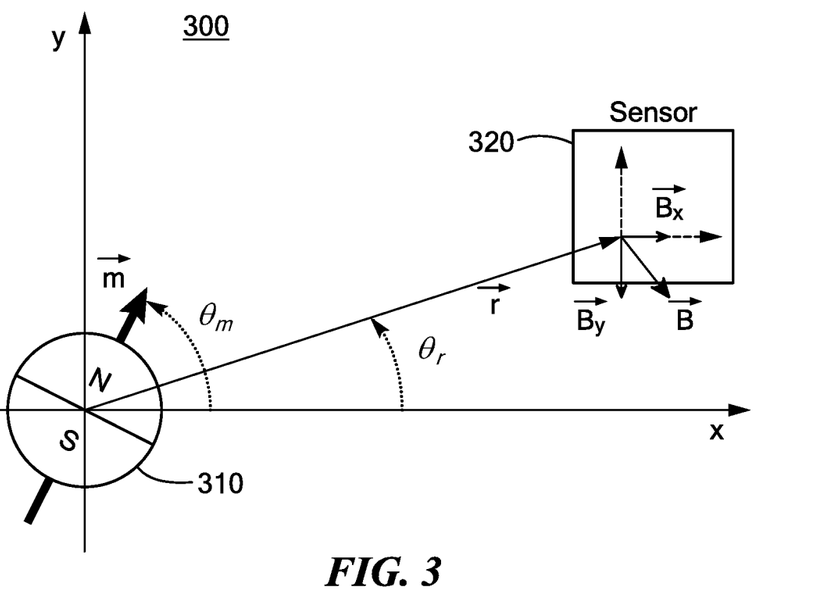
FIG. 3 is a diagram illustrating an angle measurement of a rotating magnetic dipole and the associated magnetic field signal vectors in the sensor, according to the present disclosure.

FIG. 3 is a diagram 300 illustrating an angle measurement of a dipole 310 which has a magnetic moment $\vec{m}$ and the associated in-plane orthogonal projections $\vec{B}_x$ and $\vec{B}_y$ of the magnetic field $\vec{B}$ generated by the dipole in sensor 320, according to the present disclosure. The dipole 310 can, for example, be the rotating object 220 shown in FIG. 2, and the sensor 320 can be sensor 232 shown in FIG. 2. As shown, given the position of the sensor 320 ($\vec{r}$) the angle $\theta_m$ of the magnetic moment ($\vec{m}$) of the dipole 310 can be determined using the magnitudes of the y-axis component of the field ($B_y$) and the x-axis component of the field ($B_x$) in sensor 320.

When the sensor 320 is on-axis with respect to the rotating object 310, the magnitude of the in-plane orthogonal components of the incident magnetic field are $$B_x = \frac{\mu_0 |m|}{4\pi |r|^3} \cos\theta_m \qquad \text{Equation 1}$$

$$B_y = \frac{\mu_0 |m|}{4\pi |r|^3} \sin\theta_m \qquad \text{Equation 2}$$

where |m| is the magnitude of the magnetic moment of the dipole, |r| is the magnitude of the position of the sensor, $\theta_m$ is the angle of the dipole and therefore of the rotating object and $\mu_0$ is the permeability of free space (i.e., magnetic permeability in a classical vacuum).

Since each component is the sine and cosine of the angle $\theta_m$ with the same amplitude (i.e. orthogonal functions of $\theta_m$), the angle can be calculated according to Equation 3 below.

$$\theta_m = \tan^{-1}\left(\frac{B_y}{B_x}\right) \qquad \text{Equation 3}$$

However, using Equation 3 in a sideshaft configuration can result in significant distortion of the angle measurement, as shown below.

Referring again to FIG. 3, when the sensor 320 is off-axis with respect to the rotating object 310 (sideshaft) the magnitude of the x-axis component of the sensed field, Bx, and the magnitude of the y-axis component of the sensed field, By, can be represented as follows:

$$B_x = \frac{\mu_0 |m|}{4\pi |r|^3} \cos\theta_m [3\cos^2\theta_r - 1 + 3\cos\theta_r \sin\theta_r \tan\theta_m] \qquad \text{Equation 4}$$

$$B_y = \frac{\mu_0 |m|}{4\pi |r|^3} \sin\theta_m \left[3\sin^2\theta_r - 1 + \frac{3\cos\theta_r \sin\theta_r}{\tan\theta_m}\right] \qquad \text{Equation 5}$$

where $\theta_r$ is the angle of the sensor (as shown in FIG. 3).

Consideration of Equations 4 and 5 reveals that Bx and By will deviate from orthogonal functions (sine and cosine) with the same amplitude based on factors including the position of the sensor 320 and the sensing elements relative to the magnet 310.

In the sensing element configuration shown in FIG. 2A (in which the x-axis sensing element 242 is aligned with the radial axis and the y-axis sensing element 244 is aligned with the tangential axis), we have $\theta_r=0$ and therefore general Equations 4, 5 can be simplified to the following:

$$B_x = \frac{\mu_0 |m|}{2\pi |r|^3} \cos\theta_m \qquad \text{Equation 6}$$

$$B_y = -\frac{\mu_0 |m|}{4\pi |r|^3} \sin\theta_m \qquad \text{Equation 7}$$

Figure 4:
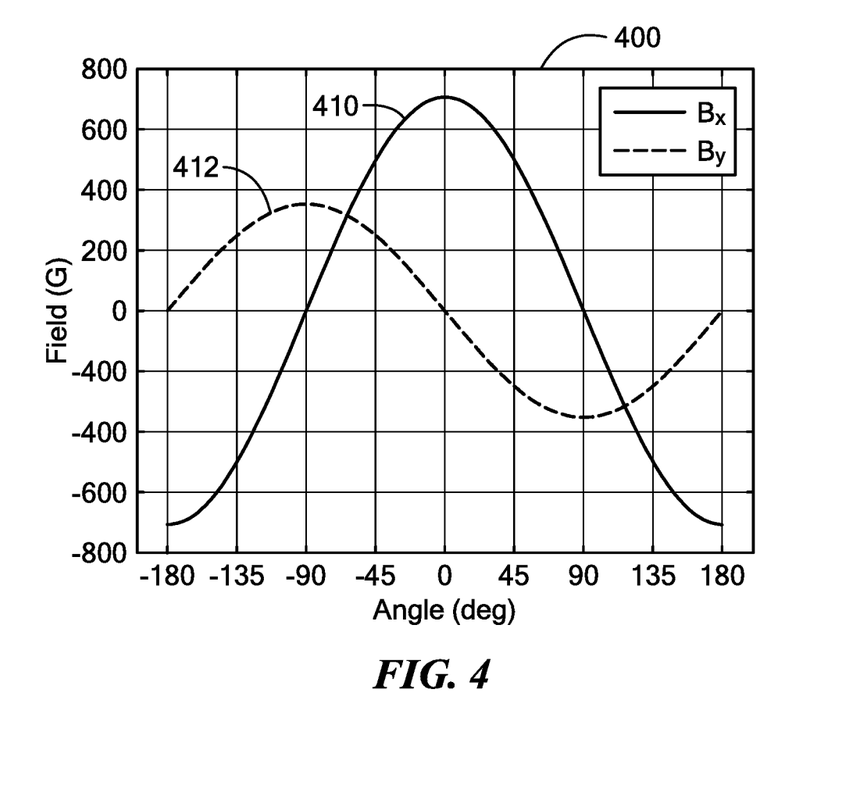
FIG. 4 is a graph of waveforms showing differing amplitudes of the magnetic field detected by each magnetic field sensing element with respect to the angle of the rotating magnet in the configuration of FIG. 2A.

FIG. 4 is a graph 400 of waveforms showing the magnetic field components Bx and By in the configuration shown in FIG. 2A. As shown in FIG. 4, the x-axis magnetic field signal 410 (Equation 6) has a first amplitude and the y-axis magnetic field signal 412 (Equation 7) has a second amplitude, different from the first amplitude. This can cause a distorted angle measurement if Equation 3 is used, as shown in FIG. 5, even though signal 410 has a 90 degree phase shift with respect to signal 412 (i.e. they are orthogonal functions of the angle).

Figure 5:
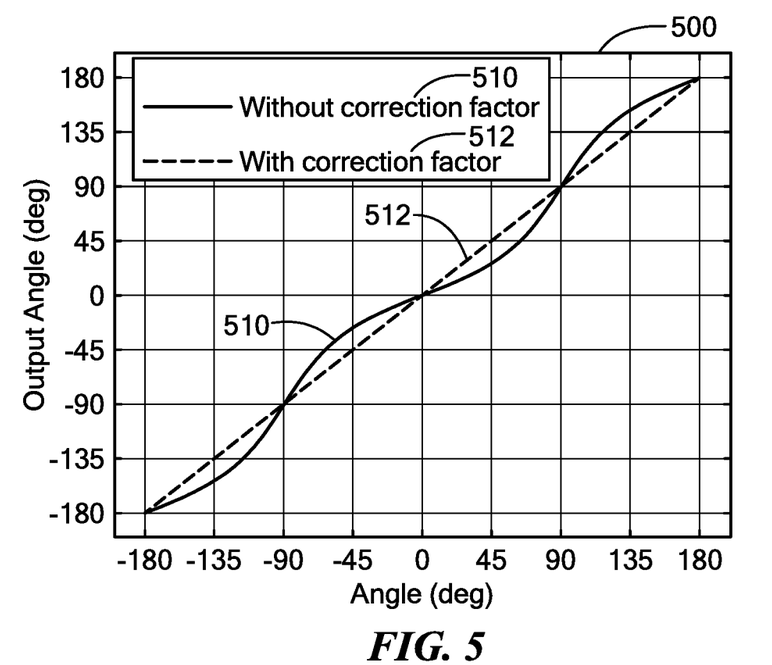
FIG. 5 is a graph of waveforms showing the measured angle by the sensor ("Output Angle") with respect to the angle of the rotating magnet, both with and without the correction factor applied, according to the present disclosure.

FIG. 5 is a graph 500 of waveforms showing the resulting angle ("Output Angle") from the magnetic field sensor (100 in FIG. 1) in the case depicted in FIG. 4 with respect to the angle of the rotating object ($\theta_m$ in FIG. 3) both with and without pre-processing, including application of the correction factor, according to the present disclosure. As shown in FIG. 5, there is a noticeable distortion in the resulting angle if Equation 3 is applied directly to Bx and By without pre-processing them (e.g., without the correction factor) as illustrated by line 510 which is essentially eliminated with the pre-processing described below illustrated by line 512 according to the present disclosure. By applying the correction factor to one or both of the magnetic field signals prior to the arctangent calculation, the distortion of the angle measurement can be eliminated, as will be appreciated in light of the present disclosure.

Consideration of Equations 6 and 7 reveals that we obtained two orthogonal functions of the angle (sine and cosine of the angle) but different amplitudes, and thus the angle measurement can be improved (i.e. distortion reduced) by multiplying the By signal by two and computing the angle of the magnetic field as follows:

$$\theta_m = \tan^{-1}\left(-\frac{2B_y}{B_x}\right) \quad \text{Equation 8}$$

Thus, it will be appreciated in light of Equation 8 that multiplying the y-axis magnetic field signal (By) times two (2) prior to the arctangent calculation will reduce or eliminate distortion in the measurement of the angle ($\theta_m$). This number (two in the case considered in FIG. 2A) may be referred to herein as a "correction factor" and may be stored for use in processing. The correction factor can be applied to one or both of the magnetic field signals to scale the magnetic field signals appropriately. However, this "correction factor" is derived from the ideal case where the object is a magnetic dipole and the sensor is far enough from it. Therefore a "calibration factor" (k) can be used to take into consideration non-idealities introduced by real magnets in real applications (e.g. a ring magnet around a metallic shaft) with the sensor in close proximity of the magnet.

The calibration factor (k) can be determined during calibration of the magnetic field sensor (for example, during a manufacturing testing or during user calibration in the final application), to identify the exact multiple (e.g., 1.5-3.0) that results in the same amplitude for the magnetic field signals. By adjusting the calibration factor as necessary during the calibration until the amplitudes of the magnetic field signals match, reduced distortion in angle measurement is achieved for the case where the sensing elements are placed in the radial (x) axis and tangential (y) axis of the rotating object (i.e. FIG. 2A). The calibration factor can be calculated internally by the pre-processors 116, 126, and/or 132 (via block 134) or externally and can be stored for processing during sensor usage. For example, it may be determined during calibration of the magnetic field sensor that multiplying the second magnetic field by 2.4, instead of the ideal correction factor 2.0, is preferred to arrive at approximately the same amplitudes for each magnetic field signals. Thus, the calibration factor is calculated as 1.2. This calibration factor is used with (e.g., multiplied by) the correction factor of 2 to provide the accurate result. Thus, it will be appreciated in light of the present disclosure that the calibration factor is determined during a manufacturing testing of the magnetic field sensor or by the user during its own calibration procedure in the final application, and used with the correction factor by the pre-processing blocks during sensor usage. The calibration factor (k) can be a value of one (meaning, the correction factor is accurate as-is), or the calibration factor can be a value approximately between approximately 0.2 and 2.0 or between approximately 1.0 and 1.5 (as determined during calibration). Other calibration factor values should be apparent in light of the present disclosure.

A second possible solution is to place the sensor for the sideshaft application such that $\theta_r$ is equal to 45-degrees (for example, as shown in FIG. 2B). With this configuration, Equations 4, 5 can be simplified to the following:

$$B_x = \frac{\mu_0|m|}{8\pi|r|^3}[\cos\theta_m + 3\sin\theta_m] \quad \text{Equation 9}$$

$$B_y = \frac{\mu_0|m|}{8\pi|r|^3}[3\cos\theta_m + \sin\theta_m] \quad \text{Equation 10}$$

Figure 6:
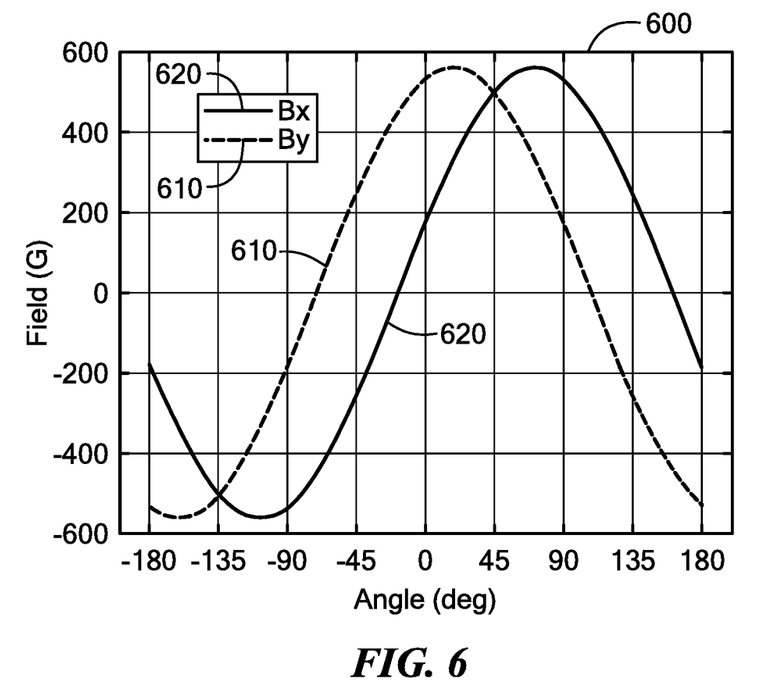
FIG. 6 is a graph of waveforms showing the same amplitude of the magnetic field detected by each magnetic field sensing element with respect to the angle of the rotating magnet in the configuration shown in FIG. 2B.

FIG. 6 is a graph 600 of waveforms showing the magnetic field components Bx and By in the configuration shown in FIG. 2B. As shown in FIG. 6, the x-axis magnetic field signal 610 (Equation 9) and the y-axis magnetic field signal 620 (Equation 10) have the same amplitude but are not orthogonal functions of the angle $\theta_m$ with respect to each other (phase shift is less than 90 degree), which can cause a distorted angle measurement if Equation 3 is used. In order to compute the angle without distortion, we need to obtain the orthogonal projections of the field.

This can be achieved with the following linear combinations $$B_{sin} = 3B_x - B_y = \frac{\mu_0|m|}{\pi|r|^3}\sin\theta_m \quad \text{Equation 11}$$

$$B_{cos} = 3B_y - B_x = \frac{\mu_0|m|}{\pi|r|^3}\cos\theta_m \quad \text{Equation 12}$$

The angle of the magnet can thus be obtained by Equation 13 below which corresponds to the arctangent of B sin/B cos based on Equations 11,12:

$$\theta_m = \tan^{-1}\left(\frac{3B_x - B_y}{3B_y - B_x}\right) \quad \text{Equation 13}$$

It should be apparent that the placement at 45-degrees provides amplitudes that match, as shown in Equations 9, 10 and FIG. 6. Thus, a simple linear combination of the outputs of the sensing elements before applying the CORDIC processing allows the angle to be obtained. However, once again, this linear combination is derived from the ideal case where the object is a magnetic dipole and the sensor is far enough from it. Therefore a "calibration factor" (k) can be used to take into consideration non-idealities introduced by real magnets in real applications (e.g. a ring magnet around a metallic shaft) with the sensor in close proximity of the magnet. In this configuration, the correction factor that must be calibrated is given by the coefficient three (3) used in the linear combination of sensing elements outputs.

The calibration factor (k) can be determined during a calibration of the magnetic field sensor determined during manufacturing testing of the magnetic field sensor or during user calibration in the final application to provide accurate results. In some scenarios, the calibration factor can be approximately 0.5-1.5, which for the correction factor of three provides a range of 1.5 o 4.5. For example, the correction factor can comprise multiplying the first magnetic field signal by three times a calibration factor (k) and multiplying the second magnetic field signal by three times the calibration factor (k). Calculating the arctangent comprises calculating the arctangent of the linear combinations of the first and second magnetic field signals. The linear combinations can be 3kBx-By and 3kBy-Bx as shown in Equations 11, 12, where Bx is the first or x-axis magnetic field signal and By is the second or y-axis magnetic field signal. The calibration factor (k) can be a value of one (meaning, the correction factor is accurate as-is), or the calibration factor can be a value approximately between approximately 0.2 and 2.0 or between approximately 0.5 and 1.0 (as determined during calibration). Other calibration factor values should be apparent in light of the present disclosure.

During calibration of the sensor, the actual angle can be calculated, and the calibration factor can be determined. Thus, a single calibration of the magnetic field sensor at one position of the rotating object can provide the calibration factor used for all positions of the rotating object. The calibration concept can optimize the correction factor used herein.

Figure 7:
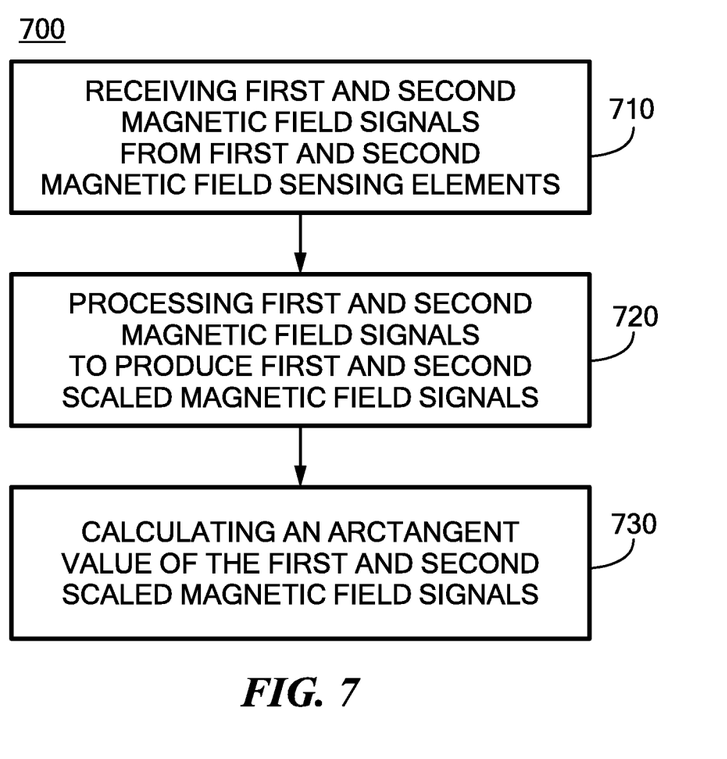
FIG. 7 is a flow diagram illustrating a process for generating the sensor output signal using a pre-processing of signals received from an analog front end, according to the present disclosure.

FIG. 7 is a flow diagram illustrating a process 700 for generating the sensor output signal by pre-processing magnetic field signals received from an analog front end, according to the present disclosure. At block 710, the first and second magnetic field signals are received from the first and second magnetic field sensing elements. These may be the same as magnetic field sensing elements 112, 122 in FIG. 1.

At block 720, the first and second magnetic field signals are processed (e.g., by pre-processing block 116, 126, and/or 132) to produce scaled magnetic field signals. The scaled magnetic field signals can be produced by applying a correction factor and/or a calibration factor to one or both of the magnetic field signals. Refer, for example, to Equations 9 and 13 hereinabove for example correction factors used to remove distortion in angle measurement of a sideshaft application.

At block 730, an arctangent value of the first and second scaled magnetic field signals is calculated. The arctangent value can be calculated for the radial/tangential configuration (shown in FIG. 2A) for example according to Equation 8. The arctangent value can be calculated for the offset configuration (shown in FIG. 2B) for example according to Equation 13.

All references cited herein are hereby incorporated herein by reference in their entirety.

Having described various embodiments, it will now become apparent to one of ordinary skill in the art that other embodiments incorporating their concepts may be used. Elements of different embodiments described herein may be combined to form other embodiments not specifically set forth above. Various elements, which are described in the context of a single embodiment, may also be provided separately or in any suitable subcombination. For example, although the techniques described herein are with the magnetic field sensing elements aligned with the radial and tangential axes (FIG. 2A), and the magnetic field sensing elements offset from the radial and tangential axes by 45-degrees (FIG. 2B), any angle of offset with respect to the radial and tangential axes can be implemented. Additionally, although the pre-processing is illustrated in the analog front end or in the digital system, the pre-processing can occur at any position that is between the magnetic field sensing elements and the arctangent extraction calculation. Additional processing elements can be included in addition to those shown and described. Other embodiments not specifically described herein are also within the scope of the following claims. Therefore, these embodiments should not be limited to disclosed embodiments, but rather should be limited only by the spirit and scope of the appended claims.

What is claimed is:

1. A method for detecting an angle of a magnetic field associated with a rotating object having an axis of rotation, a radial axis, and a tangential axis, comprising: receiving first and second magnetic field signals from an analog front end of a sensor comprising first and second magnetic field sensing elements arranged at approximately 90-degrees with respect to each other, the sensor being in a sideshaft orientation with respect to the rotating object such that the sensor is offset with respect to the rotating object, wherein the first magnetic field signal is associated with the first magnetic field sensing element and the second magnetic field signal is associated with the second magnetic field sensing element, wherein the first magnetic field sensing element is aligned at 45-degrees with respect to the radial axis of the rotating object, and wherein the second magnetic field sensing element is aligned at 45-degrees with respect to the tangential axis of the rotating object; processing the first and second magnetic field signals to produce first and second scaled magnetic field signals by applying a correction factor to at least one of the first and second magnetic field signals, wherein applying the correction factor comprises multiplying the first magnetic field signal by three times a calibration factor (k) and multiplying the second magnetic field signal by three times the calibration factor (k); and calculating an arctangent value of the first and second scaled magnetic field signals to determine the angle of the magnetic field associated with the rotating object, wherein calculating the arctangent comprises calculating the arctangent of linear combinations of the first and second magnetic field signals, and wherein the linear combinations comprise 3kBx-By and 3kBy-Bx, where Bx is the first magnetic field signal and By is the second magnetic field signal.

2. The method of claim 1, wherein the calibration factor (k) is one.

3. The method of claim 1, wherein the calibration factor (k) is between approximately 0.2 and 2.0.

4. The method of claim 3, wherein the calibration factor (k) is between approximately 0.5 and 1.0.

5. The method of claim 1, wherein calculating the arctangent value comprises using a CORDIC processor.

6. The method of claim 1, wherein any error in the first magnetic field signal associated with first magnetic field sensing element or the second magnetic field signal associated with second magnetic field sensing element is compensated for prior to calculating the arctangent value.

7. The method of claim 1, further comprising calculating the correction factor during a calibration phase.

8. A magnetic field sensor comprising: an analog front end comprising first and second magnetic field sensing elements arranged at approximately 90-degrees with respect to each other, the sensor being in a sideshaft orientation with respect to a rotating object such that the sensor is offset with respect to the rotating object having a radial axis and a tangential axis, wherein the first magnetic field sensing element is aligned at 45-degrees with respect to the radial axis of the rotating object, and wherein the second magnetic field sensing element is aligned at 45-degrees with respect to the tangential axis of the rotating object; a pre-processor configured to receive the first and second magnetic field signals from an analog front end, wherein the first magnetic field signal is associated with the first magnetic field sensing element and the second magnetic field signal is associated with the second magnetic field sensing element, and to apply a correction factor to one or both of the first and second magnetic field signals to produce first and second scaled magnetic field signals, wherein the correction factor is applied by multiplying the first magnetic field signal by three times a calibration factor (k) and multiplying the second magnetic field signal by three times the calibration factor (k); and an arctangent processor configured to calculate an arctangent value of the first and second scaled magnetic field signals, wherein calculating the arctangent comprises calculating the arctangent of linear combinations of the first and second magnetic field signals, and wherein the linear combinations comprise 3kBx-By and 3kBy-Bx, where Bx is the first magnetic field signal and By is the second magnetic field signal.

9. The magnetic field sensor of claim 8, wherein the arctangent processor comprises a CORDIC processor.

10. The magnetic field sensor of claim 8, wherein the calibration factor is one.

11. The magnetic field sensor of claim 8, wherein the calibration factor is between approximately 0.2 and 2.0.

12. The magnetic field sensor of claim 11, wherein the calibration factor is between approximately 0.5 and 1.0.

13. The magnetic field sensor of claim 11, wherein the rotating object comprises a ring magnet.

14. The magnetic field sensor of claim 8, wherein the correction factor is calculated during a calibration phase of the magnetic field sensor.

15. An apparatus comprising: means for detecting a magnetic field along a radial axis and generating a first magnetic field signal indicative of a magnetic field detected proximate a rotating object, and for detecting a magnetic field along a tangential axis of the rotating object and generating a second magnetic field signal indicative of the magnetic field detected proximate the rotating object, wherein the means for detecting the magnetic field along the radial axis and along the tangential axis is positioned in a sideshaft arrangement offset with respect to the rotating object, wherein the means for detecting the magnetic field along the radial axis is aligned at 45-degrees with respect to the radial axis of the rotating object, and wherein the means for detecting the magnetic field along the tangential axis is aligned at 45-degrees with respect to the tangential axis of the rotating object; means for applying a correction factor to one or both of the first and second magnetic field signals received from the means for detecting the magnetic field along the radial axis and the tangential axis to produce scaled first and second magnetic field signals, wherein the correction factor is applied by multiplying the first magnetic field signal by three times a calibration factor (k) and multiplying the second magnetic field signal by three times the calibration factor (k); and means for calculating an arctangent value of the scaled first and second magnetic field signals, wherein calculating the arctangent comprises calculating the arctangent of linear combinations of the first and second magnetic field signals, and wherein the linear combinations comprise 3kBx-By and 3kBy-Bx, where Bx is the first magnetic field signal and By is the second magnetic field signal.

* * * * *

UNITED STATES PATENT AND TRADEMARK OFFICE
CERTIFICATE OF CORRECTION

PATENT NO. : 11,175,160 B2
APPLICATION NO. : 16/657032
DATED : November 16, 2021
INVENTOR(S) : Pablo Aguirre et al.

It is certified that error appears in the above-identified patent and that said Letters Patent is hereby corrected as shown below:

In the Specification

Column 1, Line 37 delete "entitled" and replace with --entitled:--.

Column 9, Line 67 delete "signals." and replace with --signal.--.

Column 10, Line 11 delete "value appropriately between" and replace with --value between--.

Column 10, Line 34 delete "degree)," and replace with --degrees),--.

Column 11, Line 22 delete "value approximately between" and replace with --value between--.

Column 11, Line 42 delete "block" and replace with --blocks--.

In the Claims

Column 13, Lines 1-2, Claim 8 delete "respect the" and replace with --respect to the--.

Signed and Sealed this
Twenty-second Day of November, 2022

Katherine Kelly Vidal
*Director of the United States Patent and Trademark Office*